(12) United States Patent
Guibert et al.

(10) Patent No.: US 11,855,507 B2
(45) Date of Patent: Dec. 26, 2023

(54) ROTARY ELECTRICAL MACHINE PROVIDED WITH A PROTECTIVE COVER SECURED BY SNAP-FASTENING

(71) Applicant: Valeo Equipements Electriques Moteur, Creteil (FR)

(72) Inventors: Pierre-Henri Guibert, Etaples sur Mer (FR); Grégory Collier, Etaples sur Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 774 days.

(21) Appl. No.: 16/636,145

(22) PCT Filed: Jul. 12, 2018

(86) PCT No.: PCT/EP2018/069038
§ 371 (c)(1),
(2) Date: Feb. 3, 2020

(87) PCT Pub. No.: WO2019/025158
PCT Pub. Date: Feb. 7, 2019

(65) Prior Publication Data
US 2020/0161929 A1    May 21, 2020

(30) Foreign Application Priority Data
Aug. 3, 2017   (FR) ...................... 1757448

(51) Int. Cl.
*F16B 39/10*   (2006.01)
*H02K 5/10*    (2006.01)
(Continued)

(52) U.S. Cl.
CPC ............. *H02K 5/10* (2013.01); *F16B 21/071* (2013.01); *H02K 1/243* (2013.01); *H02K 7/1815* (2013.01)

(58) Field of Classification Search
CPC ..................................................... F16B 21/071
(Continued)

(56) References Cited

U.S. PATENT DOCUMENTS 4,135,301 A * 1/1979 Hoeppner ........... B27B 17/0033
                                                          267/137
4,531,797 A * 7/1985 Jullien ................... H01R 4/301
                                                          439/813

(Continued)

FOREIGN PATENT DOCUMENTS

DE    4134201 C1   11/1992
EP    2020734 A1   2/2009

(Continued)

OTHER PUBLICATIONS

The Notification of Reason for Rejection issued in corresponding Japanese Application No. 2020-505309, dated Mar. 30, 2021 (11 pages).

(Continued)

*Primary Examiner* — Gary W Estremsky
(74) *Attorney, Agent, or Firm* — Osha Bergman Watanabe & Burton LLP

(57) ABSTRACT

The invention relates mainly to a rotary electric machine for a motor vehicle, having: —a casing (11), —an electronic assembly (47) mounted on the casing, —a protective cover (50) positioned around the electronic assembly (47), and —a screw (55) that extends along an axis (X') and allows the cover (50) to be fastened to the casing (11) and/or electronic assembly (47). The protective cover (50) has at least one opening that forms a fastening zone into which there extends at least one tongue (56) delimiting a central opening (57) for the screw (55) to pass through. The screw (55) has a screw head (70) and a retaining groove (71) such that the tongues (56) are housed in said groove (71).

13 Claims, 4 Drawing Sheets

(51) Int. Cl.
*F16B 21/07* (2006.01)
*H02K 1/24* (2006.01)
*H02K 7/18* (2006.01)

(58) Field of Classification Search
USPC .......................................... 310/88; 411/124
See application file for complete search history.

(56) References Cited

U.S. PATENT DOCUMENTS

| | | | | |
|---|---|---|---|---|
| 4,683,108 A | * | 7/1987 | Balog | G21C 19/207 |
| | | | | 376/463 |
| 5,437,516 A | * | 8/1995 | Sauerwein | F16B 21/075 |
| | | | | 411/509 |
| 5,502,878 A | * | 4/1996 | Anscher | F16B 21/071 |
| | | | | 24/265 H |
| 5,650,676 A | * | 7/1997 | Blumenberg | F04B 17/03 |
| | | | | 310/239 |
| 5,746,456 A | * | 5/1998 | Violi | E05C 19/022 |
| | | | | 292/146 |
| 5,793,132 A | * | 8/1998 | Hirose | H02K 5/225 |
| | | | | 310/67 R |
| 5,936,320 A | * | 8/1999 | Takeda | H02K 7/1815 |
| | | | | 310/216.052 |

FOREIGN PATENT DOCUMENTS

| | | |
|---|---|---|
| FR | 2777050 A1 | 10/1999 |
| JP | S61-108507 U | 7/1986 |
| JP | 2009-236319 A | 10/2009 |

OTHER PUBLICATIONS

International Search Report and Written Opinion in corresponding International Application No. PCT/EP2018/069038, dated Nov. 6, 2018 (11 pages).

* cited by examiner

ROTARY ELECTRICAL MACHINE PROVIDED WITH A PROTECTIVE COVER SECURED BY SNAP-FASTENING

The invention relates to a rotary electrical machine provided with a protective cover secured by snap-fastening. The invention has a particularly advantageous, but non-exclusive, application in the field of alternators for motor vehicles.

An alternator of this type transforms mechanical energy into electrical energy, and can be reversible. A reversible alternator of this type is known as an alternator-starter, and makes it possible to transform electrical energy into mechanical energy, in particular in order to start the thermal engine of the vehicle. The invention can also be implemented with an electric motor.

In a known manner, a rotary electrical machine comprises a casing, and, in the interior of the latter, a rotor with claws which is integral in rotation with a shaft, and a stator which surrounds the rotor with the presence of an air gap.

The rotor can be a rotor with claws comprising two magnet wheels and a core, around which an excitation coil is wound. Alternatively, the rotor comprises a body formed by a stack of metal plate sheets which are retained in the form of a set by means of an appropriate securing system. The rotor comprises poles which are formed for example by permanent magnets accommodated in cavities provided in the magnetic mass of the rotor. Alternatively, in a so-called "projecting" poles architecture, the poles are formed by coils which are wound around arms of the rotor.

In addition, the stator comprises a body constituted by a stack of thin metal plates forming a crown, the interior face of which is provided with notches open towards the interior in order to receive phase windings. These windings pass through the notches in the body of the stator, and form chignons which project on both sides of the body of the stator. The phase windings are obtained for example from a continuous wire covered with enamel, or from conductive elements in the form of pins which are connected to one another by welding. These windings are polyphase windings, the ends of which corresponding to phase outputs are connected to an electronic control module comprising in particular a rectifier bridge in the case of an alternator, and if applicable an inverter.

A cover is fitted around the electronic control module in order to protect the module against dirt and sprays of liquid during use of the vehicle, as well as against any impacts.

As can be seen in FIG. 1, the cover 1 can be secured by means of a screw 2 provided with a double thread. One threaded part 3 makes it possible to screw the electronic control module on the rear bearing, and the other threaded part 4 makes it possible to secure the cover 1 by snap-fastening of tongues 5 of the cover 1 onto the threads of the part 4.

However, this type of securing is not robust in the long term. In fact, during vibration tests, or on the vehicle after a certain number of kilometres of travel, it is observed that there is wear of the plastic in contact with the threads, which file the tongues because of vibrations of the thermal engine. This can give rise to detachment of the protective cover 1 from its securing units.

In addition, it is generally not possible to reuse a cover 1 which has been dismantled during finishing on the assembly line, since dismantling it gives rise to breakage of the tongues 5.

The objective of the invention is to eliminate efficiently at least one of these disadvantages by proposing a rotary electrical machine for a motor vehicle. According to the invention, the machine comprises a casing, an electronic assembly fitted on the casing, a protective cover positioned around the electronic assembly, and a screw which extends along an axis, and permits the securing of the cover on the casing and/or the electronic assembly. Again according to the invention, the protective cover comprises at least one opening forming a fixing area in which there extends at least one tongue delimiting a central opening for the passage of the screw. In addition, the screw comprises a screw head and a retention groove, such that the tongues are accommodated in the said groove.

Thus, thanks to the presence of the retention groove, the invention makes it possible to ensure retention of the tongue, without the tongue being able to be subjected to excessively hard wear which could lead to detachment of the protective cover, as is the case with the system according to the prior art which puts the tongues into friction with a threaded area of the screw.

According to one embodiment, the screw head and the retention groove are without a threaded portion.

According to one embodiment, the tongue is supported against a shoulder of the screw head delimiting an axial end of the retention groove.

According to one embodiment, the shoulder extends projecting substantially radially relative to the axis of the screw. In other words, the shoulder extends on a radial plane.

For example, the groove and the shoulder extend around the entire circumference of the screw.

In particular, the shoulder has a thickness, measured in a direction which is radial relative to the axis of the screw from an outer periphery of the retention groove, which thickness is contained between 0.1 mm and 1 mm, and is preferably approximately 0.5 mm.

According to one embodiment, the tongue is flexible.

In this case, each fixing area comprises at least two tongues. For example, the tongues are distributed regularly around the circumference of the fixing area.

According to one embodiment, the screw head has an outer radial surface which is inclined relative to the axis, and the tongue has an inner radial surface, delimiting the central opening, which is inclined relative to the axis in a manner complementary to the inclination of the said outer surface of the screw head. Forms of this type make it possible to ensure retention of the protective cover during displacements of a fitting plate of the electrical machine before complete snap-fastening of the cover. In this case, the screw head and the opening in the protective cover have complementary frusto-conical forms.

According to one embodiment, an angle of opening defined between two straight lines passing via the outer radial surface of the screw heads, with the said straight lines being opposite one another relative to the axis, is contained between 10° and 45°, and is preferably 30°.

According to one embodiment, the protective cover comprises at least one dismantling rib which is inclined relative to the axis. This rib makes it possible to dismantle the protective cover without damaging it, and thus to be able to refit it after a maintenance operation of the machine, or to reuse it on another machine, if the first one is defective. In this case, the cover comprises a plurality of ribs distributed on the circumference of the fixing area.

According to one embodiment, a radial thickness of the dismantling rib is at least equal to, and preferably greater than, the thickness of the shoulder. For example, the thickness of the dismantling rib is contained between 0.1 mm and 1 mm, and is preferably 0.6 mm.

According to one embodiment, an angle of inclination of the dismantling rape relative to the axis is contained between 5 and 15°, and is preferably 10°.

According to one embodiment, an axial length of the dismantling rib is contained between 2 mm and 6 mm, and is preferably 4 mm.

According to one embodiment, a tongue is obtained from an end of a wall extending from the opening in the fixing area, such as to delimit a well for receipt of the screw head.

According to one embodiment, the second portion of the screw comprises a portion for grasping by a screwing tool, and a threaded portion which permits the retention of the screw on the casing and/or the electronic assembly.

According to one embodiment, the protective cover comprises a plurality of fixing areas, with each area having a screw passing through it.

According to one embodiment, the rotary electrical machine forms an alternator or an alternator-starter or a reversible machine, or also an electric motor.

The invention will be better understood by reading the following description and examining the figures which accompany it. These figures are provided purely by way of illustration and in no way limit the invention.

FIG. 1, already described, is a view in cross-section of a system for snap-fastening of the protective cover onto an assembly screw of the rotary electrical machine according to the prior art.

In FIGS. 2 to 7, elements which are identical, similar or analogous retain the same reference from one figure to another.

Figure 1:
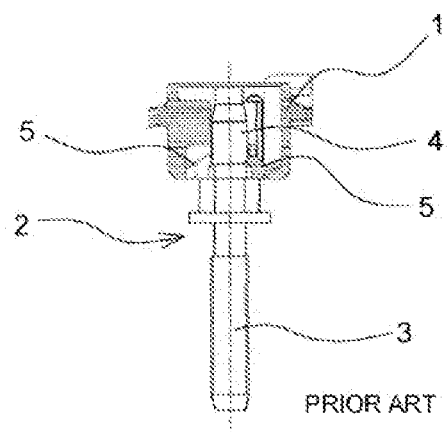
Figure 2:
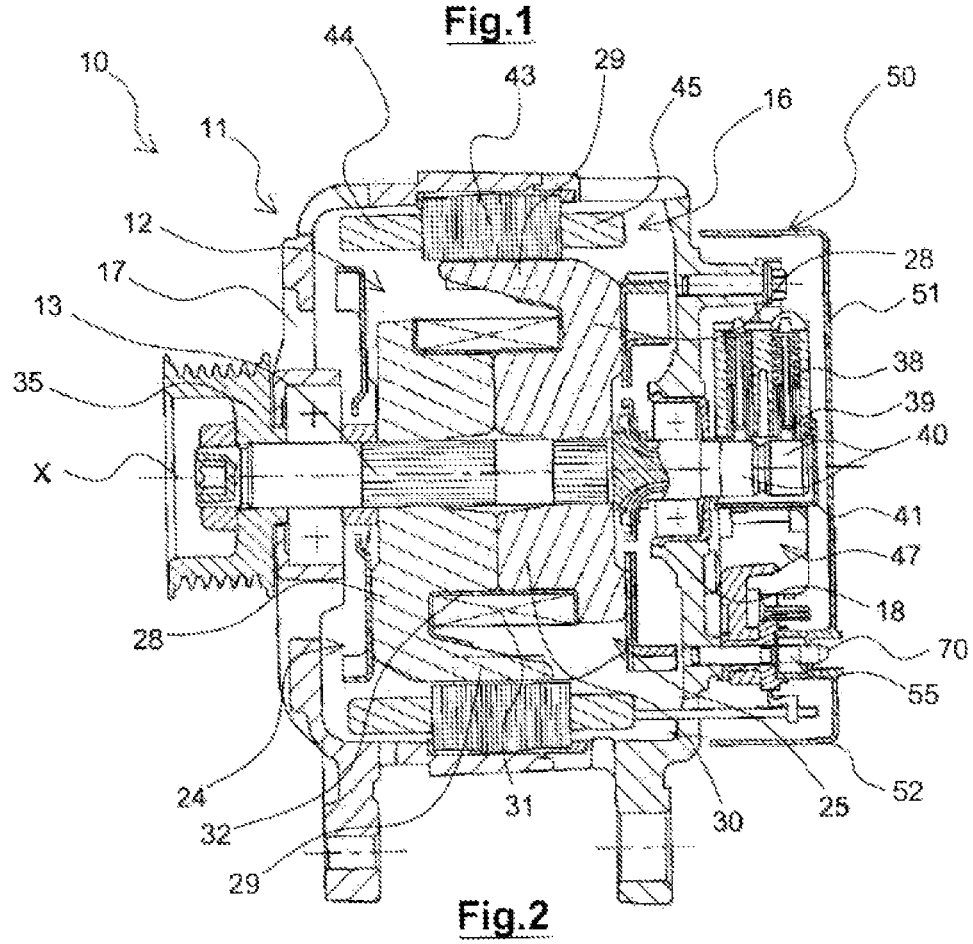
FIG. 2 is a view in longitudinal cross-section of a rotary electrical machine according to the present invention.

FIG. 2 represents a polyphase compact alternator 10, in particular for a motor vehicle. The alternator 10 can transform mechanical energy into electrical energy and can be reversible. A reversible alternator of this type, known as an alternator-starter, makes it possible to transform electrical energy into mechanical energy, in particular in order to start the thermal engine of the vehicle.

This alternator 10 comprises a casing 11, and, in the interior of the latter, a rotor with claws 12 fitted on a shaft 13, and a stator 16, which surrounds the rotor 12 with the presence of an air gap. The axis X along which the shaft 13 extends forms the axis of the electrical machine.

The casing 11 comprises front 17 and rear 18 bearings which support the stator 16. The bearings 17, 18 have a hollow form, and each support centrally a ball bearing for fitting of the shaft 13 with rotation.

More specifically, the rotor 12 comprises two magnet wheels 24, 25, each having a flange 28 with transverse orientation which is provided on its outer periphery with claws 29, which for example have a trapezoidal form and axial orientation. The claws 29 of one wheel 24, 25 face axially towards the flange 28 of the other wheel. The claws 29 of one magnet wheel 24, 25 penetrate into the space which exists between two adjacent claws 29 of the other magnet wheel, such that the claws 29 of the magnet wheels 24, 25 are imbricated relative to one another.

A cylindrical core 30 is interposed axially between the flanges 28 of the wheels 24, 25. In this case, the core 30 consists of two half-cores each belonging to one of the flanges 28. This core 30 supports on its outer periphery an excitation winding 31 which is wound in an insulator 32 interposed radially between the core 30 and the coil 31.

The shaft 13 can be forced into the central bore in the magnet wheels 24, 25. On its front end side, the shaft 13 supports a pulley 35 belonging to a movement transmission device with at least one belt between the alternator 10 and the thermal engine of the motor vehicle.

The rear bearing 18 supports a brush-holder 38 provided with brushes 39 which are designed to rub against rings 40 of a collector 41, in order to ensure the supply to the winding of the rotor 12.

In addition, the stator 16 comprises a body 43 in the form of a set of metal plates provided with notches equipped with notch insulation for fitting of the phases of the stator 16. Each phase comprises at least one winding passing through the notches in the stator body 43, and forms together with all the phases a front chignon 44 and a rear chignon 45 on both sides of the stator body 43.

The phase windings are obtained for example from a continuous wire covered with enamel, or from conductive elements in the form of pins connected electrically to one another for example by welding.

Each phase winding 47 comprises an end forming a phase output connected to an electronic assembly 47. This assembly comprises in particular an inverter and/or a rectifier bridge constituted for example by diodes or transistors of the MOSFET type, and can also comprise a control module. The assembly 47 comprises a heat dissipater permitting the cooling of the electronic modules and/or of the diodes. The electronic assembly, in particular the heat dissipater, is fitted on the rear bearing 18 by means of at least one screw 55.

Figure 3:
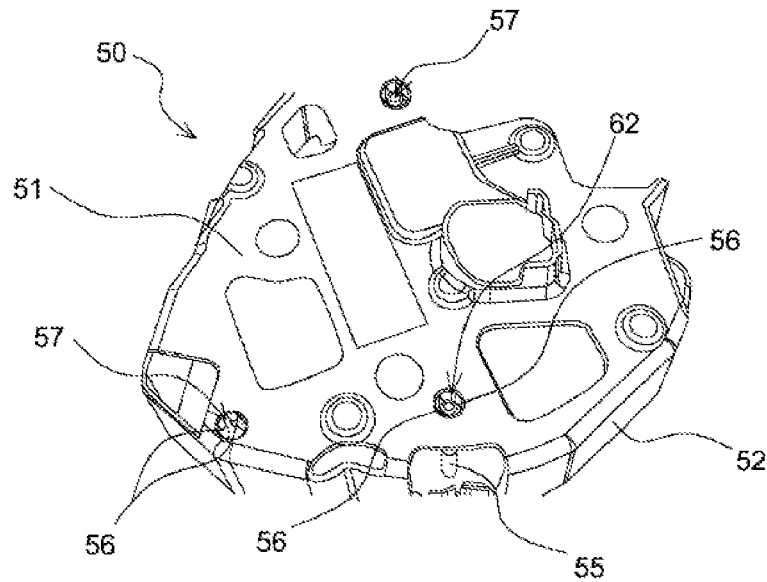
FIG. 3 is a view in perspective of an example of assembly according to the invention between a protective cover and a screw.

A protective cover 50 is positioned around the electronic assembly 47 in order to protect it against dirt and sprays of liquid during use of the motor vehicle. As can be seen in FIG. 3, the cover 50 comprises a wall 51 with radial orientation and a rim 52 with orientation which is axial relative to the axis X. This cover 50 is secured by snap-fastening onto securing screws 55.

Figure 6:
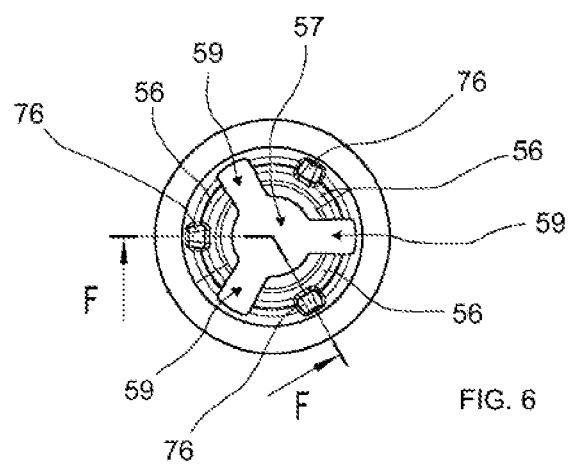
FIG. 6 is a view from above of the area of securing of the protective cover according to one embodiment.

In the example represented here, the protective cover 50 comprises openings forming fixing areas. Each fixing area comprises three flexible tongues 56 delimiting a central opening 57 which is designed to receive the head of a screw 55 described in greater detail hereinafter. In this case, a plurality of fixing areas are provided, for example three of them, each delimited by three tongues 56. The tongues 56 are separated from one another by separation slots with the reference 59, as shown in FIG. 6. For example, the tongues are distributed regularly around the circumference of the fixing area, and thus in this case spaced by 120° from one another.

Figure 5A:
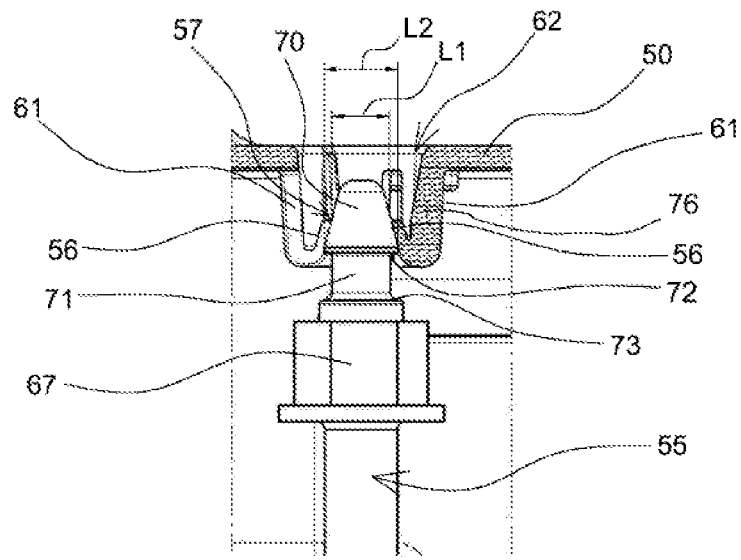
FIGS. 5a and 5b are views in cross-section of the protective cover and of the screw, respectively before and after snap-fastening of the protective cover according to the example in FIG. 3.
Figure 5B:
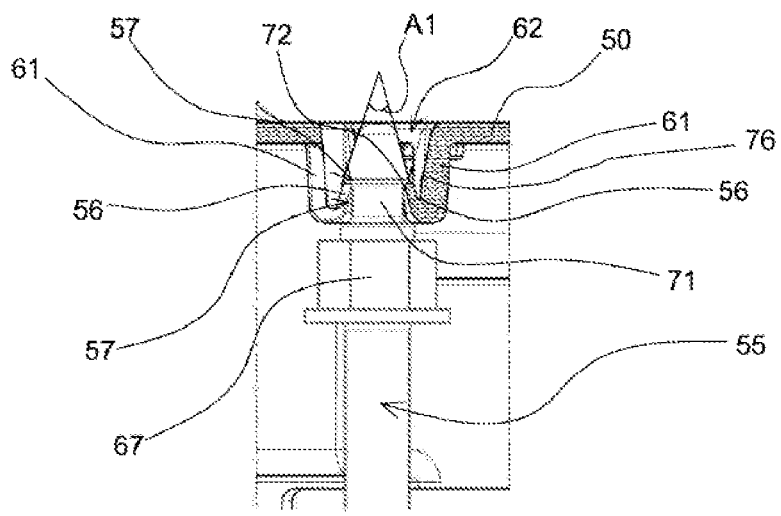

In the example represented in FIGS. 5a and 5b, a tongue 56 is obtained from an end of a wall 61 delimiting a well 62 for receipt of the screw head. For example, the wall 61 extends projecting from the radial wall 51 of the cover 50, and has a cylindrical form. Relative to the radial wall 51, the walls 61 of the well 62 face axially towards the electronic assembly 47. The tongues 56 extend projecting from the lower end of the wall 61, towards the wall 51 of the cover. Alternatively, the separation slots 59 can also extend on the wall 61, such that each tongue forms a rim of each corresponding wall 61 facing towards the open end of the well 62.

The cover 50 is preferably formed from a plastic material. The tongues 56, the wall 61, the wall 51 and the rim 52 are in a single piece, and are formed by moulding, i.e. they are integral with one another.

Figure 4:
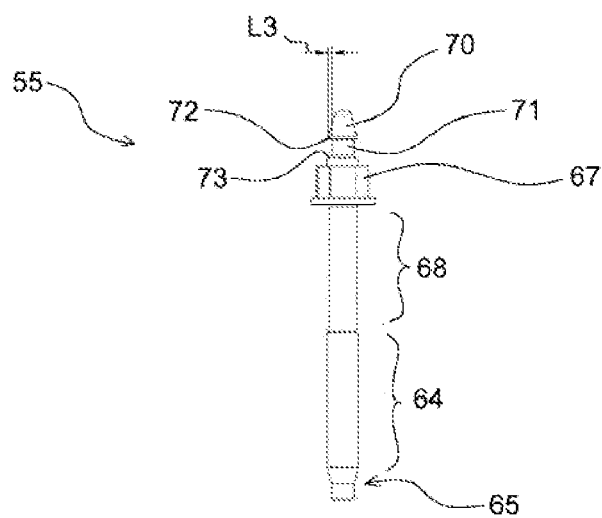
FIG. 4 is a side view of the screw permitting the snap-fastening of the protective cover according to an example of implementation of the invention.

In addition, as illustrated in the example in FIG. 4, the screw 55 comprises a first portion which permits the retention of the cover, and a second portion which permits the securing of the screw on the casing and the electronic assembly. Thus, in this example, the second portion of the screw permits the securing of the electronic assembly 47 on the casing 11, and in particular on the rear bearing 18. The screw extends along an axis X', and this axis is preferably substantially parallel to the axis X of the alternator 10. "Substantially parallel" means that an angle between these two axes is contained between 0 and 20°. As a variant, the axis X' can be substantially perpendicular or inclined relative to the axis X.

The second portion of the screw is provided with a threaded portion 64 for the securing of the heat dissipater on the rear bearing 18. A control joining piece 65 makes it possible to facilitate the putting into place of the screw 55 in the securing hole of the bearing 18 before screwing of the screw 55. In addition, a grasping portion 67, for example of the type with six faces, is provided in the second portion of the screw 55, in order to permit the manipulation of the screw 55 by an automatic screwing tool. This grasping portion is for example positioned in a manner adjacent to the first portion of the screw. The threaded portion 64 can extend as far as the grasping portion 67. As a variant, the screw 55 can comprise a non-threaded smooth area 68 between the threaded portion 64 and the grasping portion 67. The first portion of the screw 55 comprises a head 70 and a retention groove 71. The retention groove 71 is delimited axially, firstly by a shoulder 72 of the screw head 70, and secondly by a shoulder 73 which is situated on the grasping portion 67 side. As a variant, this shoulder 73 can be constituted by a radial face of the grasping portion 67.

The screw head 70 is designed to be inserted in the interior of the central opening 57 delimited by the tongues 56, such that the flexible tongues 56 are accommodated in the retention groove 71, as illustrated by FIG. 5*b*. When the cover 50 is fitted, the tongues 56 are supported against the shoulder 72 of the screw head 70. For this purpose, the inner diameter L1 of the opening 57 measured at the free end of the tongues 56 is slightly smaller than the outer diameter L2 of the shoulder 72, as shown in FIG. 5*a*.

According to one embodiment, the shoulder 72 has a radial thickness relative to the axis X' L3 (cf. FIG. 4), measured from an outer periphery of the groove 71, which is contained between 0.1 mm and 1 mm, and is preferably approximately 0.5 mm. This thickness L3 is measured in a direction which is radial relative to the axis X' of the screw 55.

In the example represented here, the screw head 70 and the opening 57 in the protective cover 50 have complementary frusto-conical forms. The screw head 70 thus has a circular cross-section on a plane which is radial relative to the axis X', the diameter of which decreases when going from the shoulder 72 of the screw head 70 towards its free end. In a strictly equivalent manner, the screw head 70 could have a variable cross-section with a polygonal form. According to one embodiment, the frusto-conical form of the head 70 has an angle of opening A1 contained between 10° and 45°, and preferably being 30°, as illustrated by FIG. 5*b*.

Figure 7:
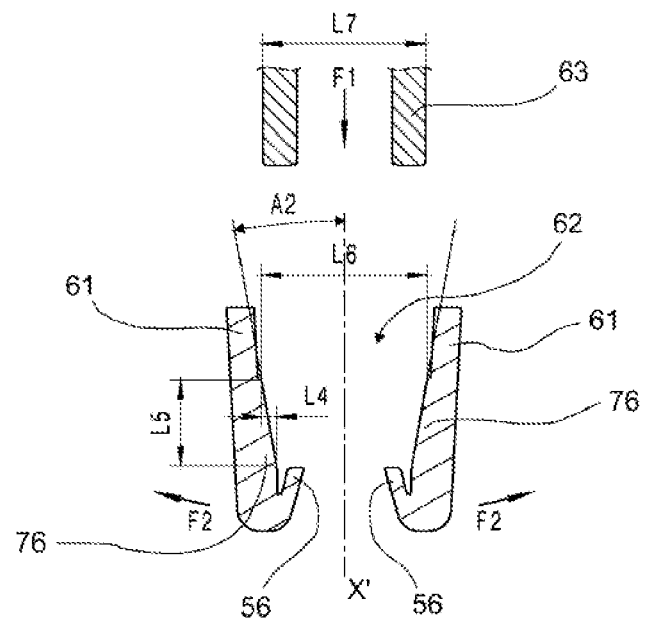
FIG. 7 is a view in cross-section along the axis F-F in FIG. 6, illustrating an example of the form of the dismantling grooves.

As can be seen in FIGS. 6 and 7 in particular, the protective cover 50 comprises inclined dismantling ribs 76 in order to permit the dismantling of the cover 50 from the screw 55. These ribs 76 extend projecting radially from the walls 61 delimiting the well 62 for receipt of the screw head 70. Preferably, the ribs are integral with the wall 61. For example, the fixing area comprises as many ribs as there are tongues.

For this purpose, a thickness L4 in a direction which is radial relative to the axis X' of the dismantling ribs 76 is at least equal to, and preferably greater than, the thickness of the shoulder 72. For example, the thickness L4 of the rib 76 is contained between 0.1 mm and 1 mm, and is preferably 0.6 mm. An angle of inclination A2 of a rib 76 relative to an axis X' is contained between 5 and 15°, and is preferably 10°. An axial length L5 of a rib 76 is contained between 2 mm and 6 mm, and is preferably 4 mm. These dimensions are given by way of illustration, and persons skilled in the art will understand that they can be adapted in particular according to the thickness of the shoulder, and the inclination and axial length of the tongues.

With reference to FIGS. 5*a* and 5*b*, a description is provided hereinafter of the fitting and dismantling of the protective cover 50 onto/from the securing screw 55. This screw 55 makes it possible to provide a double function, i.e. to secure the electronic assembly 47 on the bearing 18, and to retain the protective cover 50 by snap-fastening.

In a first stage, the screw 50 is put into place in respective openings in the heat dissipater and in the rear bearing, with the opening in the rear bearing comprising a tapped portion corresponding to the thread of the second portion of the screw, in order to fit the electronic assembly on the casing.

Then, as shown in FIG. 5*a*, the protective cover 50 is put into place, such that a screw head 70 co-operates with an opening 57 in the cover 50. The screw head 70 is not completely inserted in the interior of the central opening 57, but only partly, such that this makes it possible to ensure circumferential and radial retention of the protective cover 50 during displacements of the fitting plate of the electrical machine from one place to the other.

Complete snap-fastening of the cover 50 is then carried out by making the screw head 70 penetrate into the interior of the opening 57, until the tongues 56 are situated in the interior of the groove 71, and their free end is supported against the shoulder 72, as shown in FIG. 5*b*. The screw head 70 is then situated in the interior of the well 62, such as not to project relative to the cover 50, as can be seen in FIG. 3.

During a maintenance operation of the electronic assembly 47 which requires the removal of the protective cover 50, the operator can insert into the interior of the well 62 a tool 63 with a hollow cylindrical form in order to pass around the screw head 70.

As illustrated by FIG. 7, this tool 63 has an outer diameter L7 which is substantially equal to the diameter L6 of the well 62 measured at the intake of the slope of the rib 76, i.e. at the axial end of the rib which is closest to the wall 51 of the cover 50. The tool 63 is inserted along the entire axial length L5 of the rib 76 in the direction indicated by the arrow F1, which has the effect of spacing the tongues 56 apart in the direction of the arrows F2, relative to the shoulder 72, by a radial distance which is sufficient to eliminate the support against the shoulder 72, and permit removal of the cover 50, without axial resistance of the tongues 56.

It will be appreciated that the foregoing description has been provided purely by way of example, and does not limit the field of the invention, a departure from which would not be constituted by replacing the different elements by any other equivalents. For example, a departure from the context of the invention will not be constituted by eliminating the receipt well 62. In this example, the fixing area does not comprise a wall 61, and the tongues extend directly from the wall 51.

In addition, the different characteristics, variants, and/or embodiments of the present invention can be associated with one another according to various combinations, provided that they are not incompatible or mutually exclusive.

The invention claimed is:

1. A rotary electrical machine for a motor vehicle, the machine comprising:
   a casing;
   an electronic assembly fitted on the casing;
   a protective cover positioned around the electronic assembly; and
   a screw which extends along an axis, and permits the securing of the cover on the casing and/or the electronic assembly;
   wherein the protective cover comprises at least one opening forming a fixing area in which there extends at least one tongue delimiting a central opening for the passage of the screw,
   wherein the at least one tongue comprises a planar end surface oriented generally perpendicular to the screw axis, the screw comprising a screw head at its upper end and threaded shank at its lower end, wherein the screw includes a tapered portion at its uppermost end, an annular retention groove adjacent the tapered portion, and a hexagonal shaped grasping portion, the grasping portion and the tapered portion having diameters larger than that of the annular retention groove,
   wherein the annular retention groove is located between the tapered portion and the grasping portion, a lower end of the tapered portion defines an undercut which forms a generally planar upper end surface of the annular retention groove for latching engagement with a corresponding end surface of the at least one tongue, and
   wherein the screw head and the opening in the protective cover have complementary frusto-conical forms.

2. The rotary electrical machine according to claim 1, wherein the tongue is supported against a shoulder of the screw head delimiting an axial end of the retention groove.

3. The rotary electrical machine according to claim 2, wherein the shoulder extends projecting substantially radially relative to the axis of the screw.

4. The rotary electrical machine according to claim 1, wherein the tongue is flexible.

5. The rotary electrical machine according to claim 4, wherein the screw head has an outer radial surface which is inclined relative to the axis, and wherein the tongue has an inner radial surface, delimiting the central opening, which is inclined relative to the axis in a manner complementary to the inclination of the said outer surface of the screw head.

6. The rotary electrical machine according to claim 5, wherein an angle of opening defined between two straight lines passing via the outer radial surface of the screw head, with the said straight lines being opposite one another relative to the axis, is contained between 10° and 45°.

7. The rotary electrical machine according to claim 1, wherein the protective cover comprises at least one dismantling rib which is inclined relative to the axis.

8. The rotary electrical machine according to claim 7, wherein a radial thickness of the dismantling rib is at least equal to, and preferably greater than, a radial thickness of the shoulder.

9. The rotary electrical machine according to claim 7, wherein an angle of inclination of the dismantling rib relative to the axis is contained between 5 and 15°.

10. The rotary electrical machine according to claim 7, wherein an axial length of the dismantling rib is contained between 2 mm and 6 mm.

11. The rotary electrical machine according to claim 1, wherein the tongue is obtained from an end of a wall extending from the opening in the fixing area, such as to delimit a well for receipt of the screw head.

12. A rotary electrical machine for a motor vehicle, the machine comprising:
    a casing;
    an electronic assembly fitted on the casing;
    a protective cover positioned around the electronic assembly; and
    a screw which extends along an axis, and permits the securing of the cover on the casing and/or the electronic assembly;
    wherein the protective cover comprises at least one opening forming a fixing area in which there extends at least one tongue delimiting a central opening for the passage of the screw,
    wherein the screw comprises a screw head and a retention groove, such that the tongues are accommodated in the retention groove,
    wherein the tongue is flexible,
    wherein the screw head has an outer radial surface which is inclined relative to the axis, and wherein the tongue has an inner radial surface, delimiting the central opening, which is inclined relative to the axis in a manner complementary to the inclination of the outer radial surface of the screw head, and
    wherein an angle of opening defined between two straight lines passing via the outer radial surface of the screw head, with the straight lines being opposite one another relative to the axis, is contained between 10° and 45°.

13. A rotary electrical machine for a motor vehicle, the machine comprising:
    a casing;
    an electronic assembly fitted on the casing;
    a protective cover positioned around the electronic assembly; and
    a screw which extends along an axis, and permits the securing of the cover on the casing and/or the electronic assembly;
    wherein the protective cover comprises at least one opening forming a fixing area in which there extends at least one tongue delimiting a central opening for the passage of the screw,
    wherein the screw comprises a screw head and a retention groove, such that the tongues are accommodated in the retention groove,
    wherein the protective cover comprises at least one dismantling rib which is inclined relative to the axis, and
    wherein an angle of inclination of the dismantling rib relative to the axis is contained between 5 and 15°.

* * * * *